US012604321B2

(12) United States Patent
Marcone et al.

(10) Patent No.: US 12,604,321 B2
(45) Date of Patent: Apr. 14, 2026

(54) CONTROL CHANNEL REPETITION MANAGEMENT

(71) Applicant: Nokia Technologies Oy, Espoo (FI)

(72) Inventors: Alessio Marcone, Munich (DE); Frank Frederiksen, Aalborg (DK); Arman Ahmadzadeh, Munich (DE)

(73) Assignee: Nokia Technologies Oy, Espoo (FI)

( * ) Notice: Subject to any disclaimer, the term of this patent is extended or adjusted under 35 U.S.C. 154(b) by 358 days.

(21) Appl. No.: 18/366,271

(22) Filed: Aug. 7, 2023

(65) Prior Publication Data

US 2024/0114515 A1     Apr. 4, 2024

(30) Foreign Application Priority Data

Sep. 30, 2022     (FI) ..................................... 20225881

(51) Int. Cl.
| | |
|---|---|
| *H04W 72/21* | (2023.01) |
| *H04L 1/18* | (2023.01) |
| *H04W 76/11* | (2018.01) |

(52) U.S. Cl.
CPC .............. *H04W 72/21* (2023.01); *H04L 1/18* (2013.01); *H04W 76/11* (2018.02)

(58) Field of Classification Search
CPC .................................................... H04W 72/21
See application file for complete search history.

(56) References Cited

U.S. PATENT DOCUMENTS

| | | |
|---|---|---|
| 2019/0037569 A1 | 1/2019 | Lee et al. |
| 2019/0239255 A1 | 8/2019 | Stern-berkowitz et al. |
| 2020/0205150 A1* | 6/2020 | Cheng ................... H04W 72/21 |

| | | |
|---|---|---|
| 2021/0100004 A1 | 4/2021 | Yang et al. |
| 2021/0195653 A1 | 6/2021 | Lei et al. |
| 2021/0392679 A1 | 12/2021 | Kim et al. |
| 2022/0210844 A1 | 6/2022 | MolavianJazi et al. |
| 2022/0225360 A1 | 7/2022 | Yi et al. |
| 2024/0015749 A1* | 1/2024 | Ying ................... H04W 72/231 |
| 2024/0187190 A1* | 6/2024 | Xiong ................... H04L 5/0053 |
| 2024/0381350 A1* | 11/2024 | Lei ........................ H04W 72/04 |

(Continued)

FOREIGN PATENT DOCUMENTS

| | | |
|---|---|---|
| WO | 2016/161629 A1 | 10/2016 |
| WO | 2022/079562 A1 | 4/2022 |
| WO | 2022/085702 A1 | 4/2022 |

OTHER PUBLICATIONS

Extended European Search Report received for corresponding European Patent Application No. 23189964.2, dated Feb. 6, 2024, 9 pages.

(Continued)

*Primary Examiner* — Jason E Mattis

(74) *Attorney, Agent, or Firm* — Nokia Technologies Oy

(57)     ABSTRACT

There are provided measures for control channel repetition management. Such measures exemplarily comprise receiving, from a terminal, a connection request message, checking whether said connection request message is scrambled utilizing any of at least one temporary identifier other than a temporary identifier assigned to said terminal, and, if said connection request message is scrambled utilizing any of said at least one temporary identifier, concluding that said terminal can make use of physical uplink control channel repetitions.

20 Claims, 8 Drawing Sheets

(56)                References Cited

U.S. PATENT DOCUMENTS

| 2025/0016768 | A1* | 1/2025 | Zhao | ................. | H04W 72/1268 |
| 2025/0106847 | A1* | 3/2025 | Maki | .................... | H04L 5/0053 |

OTHER PUBLICATIONS

"3rd Generation Partnership Project; Technical Specification Group Radio Access Network; NR; Physical layer procedures for control (Release 17)", 3GPP TS 38.213, V17.2.0, Jun. 2022, pp. 1-256.

"New WI: NR NTN (Non-Terrestrial Networks) enhancements", 3GPP TSG RAN Meeting #94e, RP-213690, Agenda: 8A.2, AT&T, Dec. 6-17, 2021, 8 pages.

"3rd Generation Partnership Project; Technical Specification Group Radio Access Network; Study on NR coverage enhancements (Release 17)", 3GPP TR 38.830, V17.0.0, Dec. 2020, pp. 1-91.

"3rd Generation Partnership Project; Technical Specification Group Radio Access Network; Evolved Universal Terrestrial Radio Access (E-UTRA); Radio Resource Control (RRC); Protocol specification (Release 17)", 3GPP TS 36.331, V17.1.0, Jun. 2022, pp. 1-1128.

"Enhancements for PUCCH repetition", 3GPP TSG RAN WG1 #104-e, R1-2101576, Agenda: 8.8.2, Lenovo, Jan. 25-Feb. 5, 2021, 4 pages.

Office action received for corresponding Finnish Patent Application No. 20225881, dated Mar. 8, 2023, 16 pages.

"3rd Generation Partnership Project; Technical Specification Group Radio Access Network; NR; User Equipment (UE) radio access capabilities (Release 17)", 3GPP TS 38.306, V17.2.0, Sep. 2022, pp. 1-244.

* cited by examiner

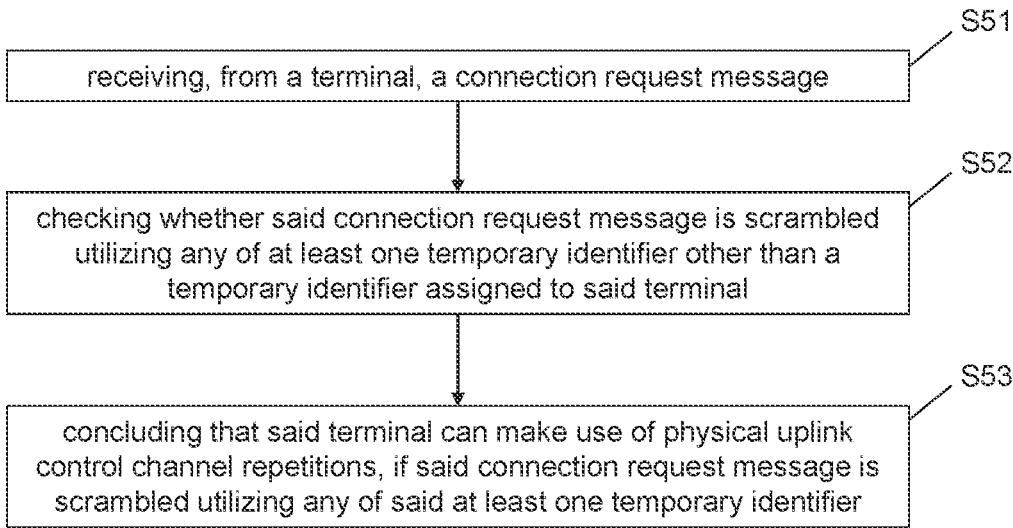

S51 receiving, from a terminal, a connection request message

S52 checking whether said connection request message is scrambled utilizing any of at least one temporary identifier other than a temporary identifier assigned to said terminal

S53 concluding that said terminal can make use of physical uplink control channel repetitions, if said connection request message is scrambled utilizing any of said at least one temporary identifier

Fig. 5

CONTROL CHANNEL REPETITION MANAGEMENT

RELATED APPLICATION

This application was originally filed as a Finnish Patent Application No. 20225881, on 30 Sep. 2022, which is hereby incorporated in its entirety.

FIELD

Various example embodiments relate to control channel repetition management. More specifically, various example embodiments exemplarily relate to measures (including methods, apparatuses and computer program products) for realizing control channel repetition management.

BACKGROUND

The present specification generally relates to enhancements in mobile radio scenarios. Such enhancements may include coverage enhancements, in particular, but not limited to, coverage enhancements in non-terrestrial network scenarios. Accordingly, the present specification relates to $3^{rd}$ Generation Partnership Project (3GPP) New Radio (NR) (but also other, e.g. future, radio technologies), and in particular, but not limited to, to non-terrestrial networks (NTN).

Upon evaluation in relation to coverage performance to identify candidate physical radio channels that have coverage issues specific to NTN in particular in relation to voice over internet protocol (VoIP) and low-data rate services for commercial handset terminals, it was found that the physical uplink control channel (PUCCH) for Msg4 (message 4 in a random access (RA) procedure) HARQ-ACK (hybrid automatic repeat request (HARQ) acknowledgement) may not meet the coverage requirements. Such finding as exemplary based on parameter set-1 for LEO-1200 (satellite) operating at line-of-sight (LOS), assuming −5 dBi UE antenna gain.

The PUCCH is the channel used in the uplink (UL) by a terminal such as a user equipment (UE) for conveying control information through the UL control information (UCI).

PUCCH time-frequency resources are radio resource control (RRC) configured per UE, and different resources can be configured for different number of bits in the UCI.

For example, for UCI with payload smaller than 2 bits, up to 32 PUCCH resources can be configured, whereas for UCI with payload larger than 2 bits, up to 8 PUCCH resources can be configured.

PUCCH resources can be used for reporting different UCI types, including hybrid automatic repeat request (HARQ) acknowledgement (HARQ-ACK), scheduling request (SR), and channel state information (CSI), in a periodic, semi-persistent or dynamic manner.

For example, the HARQ-ACK feedback for a scheduled physical downlink shared channel (PDSCH) is conveyed through a PUCCH resource indicated by the PUCCH resource indicator (PRI) field in the scheduling downlink control information (DCI). Conversely, periodic CSI is conveyed by a periodic PUCCH resource RRC configured.

As mentioned, the PUCCH carrying the Msg4 HARQ-ACK was found to potentially conflict with coverage requirements.

This potential conflicting is related to that PUCCH repetitions are not possible for this type of PUCCH. This HARQ-ACK is transmitted before RRC configuration of the PUCCH resources and parameters (such as number of repetitions), and hence current specification have no way to indicate the number of repetitions for such PUCCH.

Namely, in initial access, and for transmission of the HARQ-ACK feedback for the Msg4, RRC configuration of PUCCH resources did not occur yet.

For this reason, 3GPP TS 38.213 defines a table of PUCCH resource sets before a dedicated PUCCH resource configuration occurs, with 16 different PUCCH resources. This table however does not contain information on the number of PUCCH repetitions for each resource, since PUCCH repetitions for PUCCH transmissions before RRC configuration are currently not supported.

In addition, whether a UE needs and/or supports dynamic PUCCH repetitions for different formats (e.g. format 0 or format 1) is currently not a mandatory feature based on TS 38.306, and hence such information needs to be conveyed to the network in initial access before RRC configuration. Indeed, differently than in RRC connected state when network is aware of UE capabilities and necessities, in initial access, such information is not yet available to the network.

Hence, the problem arises that improving the coverage of the PUCCH for Msg4 HARQ-ACK, or more general, of physical radio channels that may have coverage issues, is necessary. While proposing respective solutions, it is to be understood that these are not limited to the above-outlined scenarios but may be applicable e.g. for non-NTN scenarios or for physical channels other than the PUCCH.

Hence, there is a need to provide for control channel repetition management.

SUMMARY

Various example embodiments aim at addressing at least part of the above issues and/or problems and drawbacks.

Various aspects of example embodiments are set out in the appended claims.

According to an exemplary aspect, there is provided a method comprising receiving, from a terminal, a connection request message, checking whether said connection request message is scrambled utilizing any of at least one temporary identifier other than a temporary identifier assigned to said terminal, and if said connection request message is scrambled utilizing any of said at least one temporary identifier, concluding that said terminal can make use of physical uplink control channel repetitions.

According to an exemplary aspect, there is provided a method of a terminal, comprising deciding whether to indicate that it can be made use of physical uplink control channel repetitions, and transmitting, towards a base station, a connection request message, and if it is decided to indicate that said terminal can make use of physical uplink control channel repetitions scrambling said connection request message utilizing a temporary identifier of at least one temporary identifier other than a temporary identifier assigned to said terminal.

According to an exemplary aspect, there is provided an apparatus comprising receiving circuitry configured to receive, from a terminal, a connection request message, checking circuitry configured to check whether said connection request message is scrambled utilizing any of at least one temporary identifier other than a temporary identifier assigned to said terminal, and concluding circuitry configured to, if said connection request message is scrambled utilizing any of said at least one temporary identifier, conclude that said terminal can make use of physical uplink control channel repetitions.

According to an exemplary aspect, there is provided an apparatus of a terminal, comprising deciding circuitry configured to decide whether to indicate that it can be made use of physical uplink control channel repetitions, transmitting circuitry configured to transmit, towards a base station, a connection request message, and scrambling circuitry configured to, if it is decided to indicate that said terminal can make use of physical uplink control channel repetitions, scramble said connection request message utilizing a temporary identifier of at least one temporary identifier other than a temporary identifier assigned to said terminal.

According to an exemplary aspect, there is provided an apparatus comprising at least one processor, at least one memory including computer program code, and at least one interface configured for communication with at least another apparatus, the at least one processor, with the at least one memory and the computer program code, being configured to cause the apparatus to perform receiving, from a terminal, a connection request message, checking whether said connection request message is scrambled utilizing any of at least one temporary identifier other than a temporary identifier assigned to said terminal, and if said connection request message is scrambled utilizing any of said at least one temporary identifier, concluding that said terminal can make use of physical uplink control channel repetitions.

According to an exemplary aspect, there is provided an apparatus of a terminal, comprising at least one processor, at least one memory including computer program code, and at least one interface configured for communication with at least another apparatus, the at least one processor, with the at least one memory and the computer program code, being configured to cause the apparatus to perform deciding whether to indicate that it can be made use of physical uplink control channel repetitions, and transmitting, towards a base station, a connection request message, and if it is decided to indicate that said terminal can make use of physical uplink control channel repetitions scrambling said connection request message utilizing a temporary identifier of at least one temporary identifier other than a temporary identifier assigned to said terminal.

According to an exemplary aspect, there is provided a computer program product comprising computer-executable computer program code which, when the program is run on a computer (e.g. a computer of an apparatus according to any one of the aforementioned apparatus-related exemplary aspects of the present disclosure), is configured to cause the computer to carry out the method according to any one of the aforementioned method-related exemplary aspects of the present disclosure.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient communication and decision making in relation to physical channel repetitions to thereby solve at least part of the problems and drawbacks identified in relation to the prior art.

By way of example embodiments, there is provided control channel repetition management. More specifically, by way of example embodiments, there are provided measures and mechanisms for realizing control channel repetition management.

Thus, improvement is achieved by methods, apparatuses and computer program products enabling/realizing control channel repetition management.

BRIEF DESCRIPTION OF THE DRAWINGS

In the following, the present disclosure will be described in greater detail by way of non-limiting examples with reference to the accompanying drawings, in which FIG. 5 is a schematic diagram of a procedure according to example embodiments.

DETAILED DESCRIPTION

Figure 1:
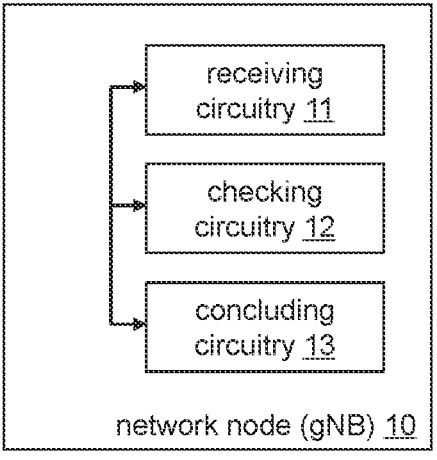
FIG. 1 is a block diagram illustrating an apparatus according to example embodiments.

The present disclosure is described herein with reference to particular non-limiting examples and to what are presently considered to be conceivable embodiments. A person skilled in the art will appreciate that the disclosure is by no means limited to these examples, and may be more broadly applied.

It is to be noted that the following description of the present disclosure and its embodiments mainly refers to specifications being used as non-limiting examples for certain exemplary network configurations and deployments. Namely, the present disclosure and its embodiments are mainly described in relation to 3GPP specifications being used as non-limiting examples for certain exemplary network configurations and deployments. In particular, non-terrestrial network scenarios and the PUCCH for Msg4 HARQ-ACK is used as a non-limiting example for the applicability of thus described example embodiments. As such, the description of example embodiments given herein specifically refers to terminology which is directly related thereto. Such terminology is only used in the context of the presented non-limiting examples, and does naturally not limit the disclosure in any way. Rather, any other communication or communication related system deployment, etc. may also be utilized as long as compliant with the features described herein.

Hereinafter, various embodiments and implementations of the present disclosure and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to example embodiments, in general terms, there are provided measures and mechanisms for (enabling/realizing) control channel repetition management.

In general, according to example embodiments, reporting UE capability of supporting e.g. PUCCH repetitions and requesting e.g. PUCCH repetitions for the HARQ-ACK of the Msg4 is provided. While example embodiments focus on the UE's indication as requesting PUCCH repetitions, this requesting PUCCH repetitions is to be considered as also encompassing e.g. the UE indicating its PUCCH repetition capability in initial access.

In particular, in brief, according to example embodiments, a gNB configures, and a UE uses, a set of additional temporary cell radio network temporary identifier (TC-RNTI) values for scrambling of the Msg3 (message 3 in RA procedure), to be used for requesting PUCCH repetitions of the subsequent HARQ-ACK.

In other words, according to example embodiments, when a UE wants to request PUCCH repetitions, the UE utilizes one TC-RNTI value of the configured set (one TC-RNTI value different from the assigned TC-RNTI value in the Msg2 (message 2 in RA procedure)) to convey such information (i.e., whether to be able to or to request or to demand or to recommend repetitions) to the gNB.

According to example embodiments, firstly, a pool of reserved TC-RNTI values for requesting of PUCCH repetitions for the HARQ-ACK of the Msg4 (and potentially later messages until UE capabilities has been exchanged) are configured.

The configuration of such pool may be explicit and/or implicit.

According to the first option, the configuration of such pool is explicit, and carried e.g. in the Msg2 containing the UL grant for the related Msg3 or in a broadcast message such as the System Information Block (SIB) 1.

In this first option, according to example embodiments, two TC-RNTI values can be indicated in the Msg2 or SIB1, and the UE uses the second TC-RNTI from the pool of two values when requesting PUCCH repetitions.

In this first option, according to further example embodiments, the UE is provided with "pointers" to specific entries in a pre-configured table that may be either defined by specifications or through the gNB providing the table as broadcast signaling. That is, the gNB may provide an offset or pointer into a table, which may be used to derive a second TC-RNTI that is to be used by the UE to indicate a certain capability.

According to a second option, the configuration of such pool is implicit and derived from the assigned TC-RNTI in Msg2. In this case, the structure of the Msg2 or SIB1 (if TC-RNTI is broadcast) is unchanged, and the UE implicitly derives another TC-RNTI from the indicated one for requesting PUCCH repetitions.

In this second option, according to example embodiments, an offset value is indicated in e.g. one of the system information blocks (SIB), for a UE to derive a TC-RNTI from the indicated TC-RNTI in the Msg2 that is to be used for requesting PUCCH repetitions.

According to example embodiments, secondly, the UE scrambles the Msg3 based on whether the UE is capable of or requesting Msg3 repetitions or not. In this regard, scrambling may mean that encoded bits (of the message) are scrambled with a pseudo-random sequence generated with an initialization number that depends on the used TC-RNTI.

Heretofore, according to example embodiments, the request/indication is based on an evaluation of downlink (DL) metrics (e.g. DL reference signal received power (RSRP)), and the UE may request PUCCH repetitions (indicate PUCCH repetition capability) only if the DL RSRP is below a threshold.

According to further example embodiments, heretofore, the UE recommends a number of PUCCH repetitions based on channel conditions, and it would do so by scrambling the Msg3 with different and appropriate TC-RNTI values.

Example embodiments are specified below in more detail.

FIG. 1 is a block diagram illustrating an apparatus according to example embodiments. The apparatus may be an access node or entity (more general, a network node or entity) 10 such as a base station (gNB) (or network node or entity providing such functionality) comprising a receiving circuitry 11, a checking circuitry 12, and a concluding circuitry 13. The receiving circuitry 11 receives, from a terminal, a connection request message. The checking circuitry 12 checks whether said connection request message is scrambled utilizing any of at least one temporary identifier other than a temporary identifier assigned to said terminal. The concluding circuitry 13, if said connection request message is scrambled utilizing any of said at least one temporary identifier, concludes that said terminal can make use of physical uplink control channel repetitions. FIG. 5 is a schematic diagram of a procedure according to example embodiments.

The apparatus according to FIG. 1 may perform the method of FIG. 5 but is not limited to this method. The method of FIG. 5 may be performed by the apparatus of FIG. 1 but is not limited to being performed by this apparatus.

As shown in FIG. 5, a procedure according to example embodiments comprises an operation of receiving (S51), from a terminal, a connection request message, an operation of checking (S52) whether said connection request message is scrambled utilizing any of at least one temporary identifier other than a temporary identifier assigned to said terminal, and an operation of, if said connection request message is scrambled utilizing any of said at least one temporary identifier, concluding (S53) that said terminal can make use of physical uplink control channel repetitions.

Figure 2:
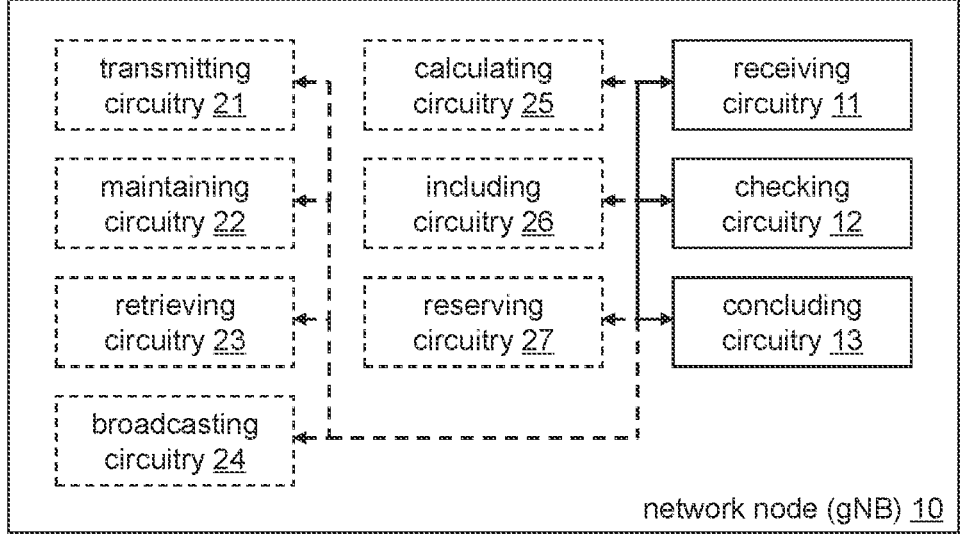
FIG. 2 is a block diagram illustrating an apparatus according to example embodiments.

FIG. 2 is a block diagram illustrating an apparatus according to example embodiments. In particular, FIG. 2 illustrates a variation of the apparatus shown in FIG. 1. The apparatus according to FIG. 2 may thus further comprise a transmitting circuitry 21, a maintaining circuitry 22, a retrieving circuitry 23, a broadcasting circuitry 24, a calculating circuitry 25, an including circuitry 26, and/or a reserving circuitry 27.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to a variation of the procedure shown in FIG. 5, that said terminal can make use of physical uplink control channel repetitions includes said terminal's capability for physical uplink control channel repetitions.

According to a variation of the procedure shown in FIG. 5, that said terminal can make use of physical uplink control channel repetitions includes said terminal's demand for physical uplink control channel repetitions. A demand in the present sense is to be considered broad and may range from an internal demand to an explicitly expressed request, thereby including for example also recommendations.

According to a variation of the procedure shown in FIG. 5, exemplary details of the concluding operation (S53) are given, which are inherently independent from each other as such.

Such exemplary concluding operation (S53) according to example embodiments may comprise an operation of concluding, if said connection request message is scrambled utilizing a first temporary identifier of said at least one temporary identifier, that said terminal recommends a first number of physical uplink control channel repetitions, and an operation of concluding, if said connection request message is scrambled utilizing a second temporary identifier of said at least one temporary identifier different from said first temporary identifier of said at least one temporary identifier, that said terminal recommends a second number of physical uplink control channel repetitions different from said first number of physical uplink control channel repetitions.

According to a variation of the procedure shown in FIG. 5, exemplary additional operations are given, which are inherently independent from each other as such. According to such variation, an exemplary method according to example embodiments may comprise an operation of transmitting, towards said terminal, a first message, wherein said first message includes information indicative of said at least one temporary identifier.

According to further example embodiments, said first message includes an uplink grant granting transmission of said connection request message.

According to further example embodiments, said information indicative of said at least one temporary identifier includes said at least one temporary identifier.

According to a variation of the procedure shown in FIG. 5, exemplary additional operations are given, which are inherently independent from each other as such. According to such variation, an exemplary method according to example embodiments may comprise an operation of maintaining a list of a plurality of temporary identifiers including said at least one temporary identifier. Here the information indicative of said at least one temporary identifier includes at least one index of said list respectively pointing towards said at least one temporary identifier in said list.

According to a variation of the procedure shown in FIG. 5, exemplary additional operations are given, which are inherently independent from each other as such. According to such variation, an exemplary method according to example embodiments may comprise an operation of retrieving said list. Here, it is noted that the list may be standardized, and the network node may have the same stored in its own memory or may have access to any other storage location thereof. That is, the retrieving may encompass reading the same from a memory, requesting the same from another location, and pre-determine the same based on the content of any storage location thereof.

According to a variation of the procedure shown in FIG. 5, exemplary additional operations are given, which are inherently independent from each other as such. According to such variation, an exemplary method according to example embodiments may comprise an operation of broadcasting said list.

According to a variation of the procedure shown in FIG. 5, exemplary additional operations are given, which are inherently independent from each other as such. According to such variation, said first message includes said temporary identifier assigned to said terminal, and an exemplary method according to example embodiments may comprise an operation of calculating, for each of said at least one temporary identifier, a respective offset value from said temporary identifier assigned to said terminal. Here, the information indicative of said at least one temporary identifier includes said respective at least one offset value.

According to a variation of the procedure shown in FIG. 5, exemplary additional operations are given, which are inherently independent from each other as such. According to such variation, an exemplary method according to example embodiments may comprise an operation of calculating, for each of said at least one temporary identifier, a respective offset value from said temporary identifier assigned to said terminal, and an operation of including said respective at least one offset value into a system information block to be transmitted towards said terminal.

According to a variation of the procedure shown in FIG. 5, exemplary additional operations are given, which are inherently independent from each other as such. According to such variation, an exemplary method according to example embodiments may comprise an operation of retrieving at least one offset value, and an operation of calculating, for each of said at least one offset value, said at least one temporary identifier based on said temporary identifier assigned to said terminal and said respective at least one offset value. Here, it is noted that the offset value may be standardized, and the network node may have the same stored in its own memory or may have access to any other storage location thereof. That is, the retrieving may encompass reading the same from a memory, requesting the same from another location, and pre-determine the same based on the content of any storage location thereof.

According to a variation of the procedure shown in FIG. 5, exemplary additional operations are given, which are inherently independent from each other as such. According to such variation, an exemplary method according to example embodiments may comprise an operation of reserving said at least one temporary identifier.

According to further example embodiments, said connection request message is a random access procedure message 3.

According to further example embodiments, said first message is a random access procedure message 2.

According to further example embodiments, each of said at least one temporary identifier and/or said temporary identifier assigned to a terminal is a temporary cell radio network temporary identifier.

According to further example embodiments, said method is operable at or by a base station or access node of a cellular system.

Figure 3:
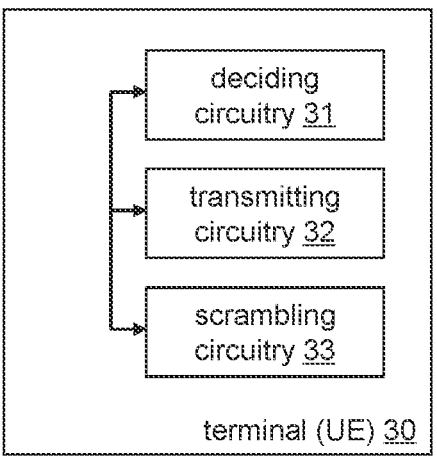
FIG. 3 is a block diagram illustrating an apparatus according to example embodiments.
Figure 6:
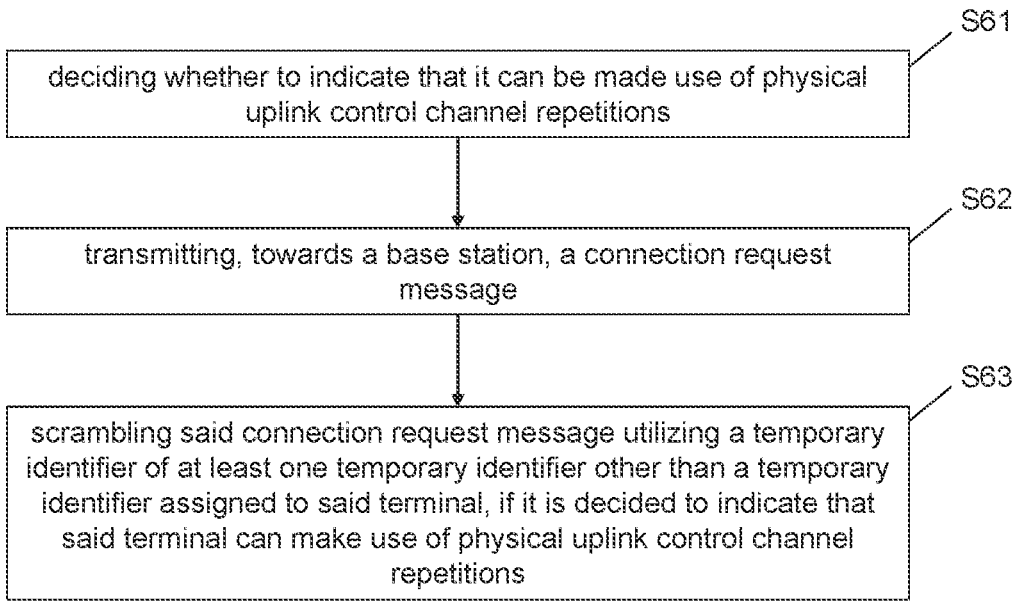
FIG. 6 is a schematic diagram of a procedure according to example embodiments.

FIG. 3 is a block diagram illustrating an apparatus according to example embodiments. The apparatus may be a terminal 30 such as a user equipment (UE) (or network node or entity providing such functionality) comprising a deciding circuitry 31, a transmitting circuitry 32, and a scrambling circuitry 33. The deciding circuitry 31 decides whether to indicate that it can be made use of physical uplink control channel repetitions. The transmitting circuitry 32 transmits, towards a base station, a connection request message. The scrambling circuitry 33, if it is decided to indicate that it can be made use of (in other words, the apparatus 30 (e.g. terminal, a user equipment) can make use of) physical uplink control channel repetitions, scrambles said connection request message utilizing a temporary identifier of at least one temporary identifier other than a temporary identifier assigned to said terminal. FIG. 6 is a schematic diagram of a procedure according to example embodiments. The apparatus according to FIG. 3 may perform the method of FIG. 6 but is not limited to this method. The method of FIG. 6 may be performed by the apparatus of FIG. 3 but is not limited to being performed by this apparatus.

As shown in FIG. 6, a procedure according to example embodiments comprises an operation of deciding (S61) whether to indicate that it can be made use of physical uplink control channel repetitions, an operation of transmitting (S62), towards a base station, a connection request message, and an operation of scrambling (S63), if it is decided to indicate that said terminal can make use of physical uplink control channel repetitions, said connection request message utilizing a temporary identifier of at least one temporary identifier other than a temporary identifier assigned to said terminal.

Figure 4:
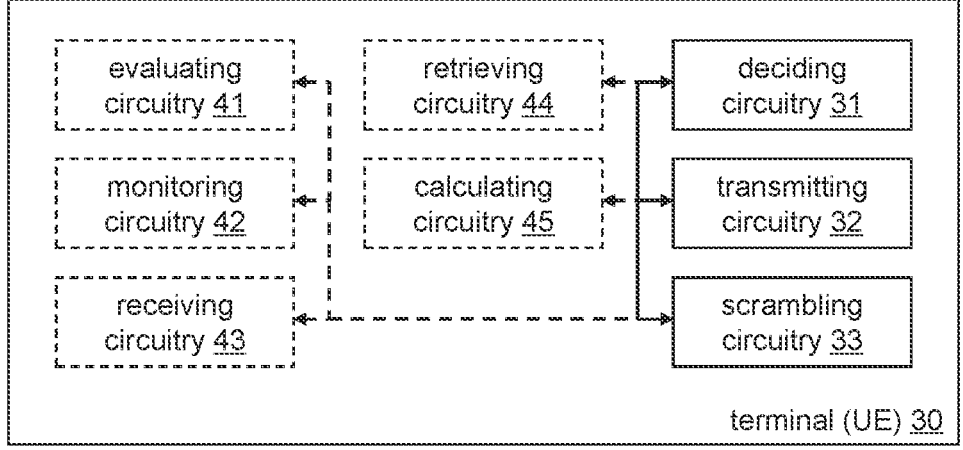
FIG. 4 is a block diagram illustrating an apparatus according to example embodiments.

FIG. 4 is a block diagram illustrating an apparatus according to example embodiments. In particular, FIG. 4 illustrates a variation of the apparatus shown in FIG. 3. The apparatus according to FIG. 4 may thus further comprise an evaluating circuitry 41, a monitoring circuitry 42, a receiving circuitry 43, a retrieving circuitry 44, and/or a calculating circuitry 45.

In an embodiment at least some of the functionalities of the apparatus shown in FIG. 3 (or 4) may be shared between two physically separate devices forming one operational entity. Therefore, the apparatus may be seen to depict the operational entity comprising one or more physically separate devices for executing at least some of the described processes.

According to a variation of the procedure shown in FIG. 6, that said terminal can make use of physical uplink control channel repetitions includes said terminal's capability for physical uplink control channel repetitions.

According to a variation of the procedure shown in FIG. 6, it is decided to indicate that said terminal can make use of physical uplink control channel repetitions, if, on initial access of said terminal, said terminal has capability for physical uplink control channel repetitions.

According to a variation of the procedure shown in FIG. 6, that said terminal can make use of physical uplink control channel repetitions includes said terminal's demand for physical uplink control channel repetitions. A demand in the present sense is to be considered broad and may range from an internal demand to an explicitly expressed request, thereby including for example also recommendations.

According to a variation of the procedure shown in FIG. 6, it is decided to indicate that said terminal can make use of physical uplink control channel repetitions, if at least one downlink metric is below a predetermined threshold.

According to a variation of the procedure shown in FIG. 6, exemplary additional operations are given, which are inherently independent from each other as such. According to such variation, an exemplary method according to example embodiments may comprise an operation of evaluating said downlink metrics.

According to a variation of the procedure shown in FIG. 6, it is decided to indicate that said terminal can make use of physical uplink control channel repetitions based on channel conditions.

According to a variation of the procedure shown in FIG. 6, exemplary additional operations are given, which are inherently independent from each other as such. According to such variation, an exemplary method according to example embodiments may comprise an operation of monitoring said channel conditions.

According to a variation of the procedure shown in FIG. 6, exemplary details of the scrambling operation (S63) are given, which are inherently independent from each other as such.

Such exemplary scrambling operation (S63) according to example embodiments may comprise an operation of scrambling said connection request message utilizing a first temporary identifier of said at least one temporary identifier, if said terminal recommends a first number of physical uplink control channel repetitions, and an operation of scrambling said connection request message utilizing a second temporary identifier of said at least one temporary identifier different from said first temporary identifier of said at least one temporary identifier, if said terminal recommends a second number of physical uplink control channel repetitions different from said first number of physical uplink control channel repetitions.

According to a variation of the procedure shown in FIG. 6, exemplary additional operations are given, which are inherently independent from each other as such. According to such variation, an exemplary method according to example embodiments may comprise an operation of receiving a first message, wherein said first message includes information indicative of said at least one temporary identifier.

According to further example embodiments, said first message includes an uplink grant granting transmission of said connection request message.

According to further example embodiments, said information indicative of said at least one temporary identifier includes said at least one temporary identifier.

According to a variation of the procedure shown in FIG. 6, exemplary additional operations are given, which are inherently independent from each other as such. According to such variation, an exemplary method according to example embodiments may comprise an operation of retrieving a list of a plurality of temporary identifiers including said at least one temporary identifier, or an operation of receiving said list. In both cases, the information indicative of said at least one temporary identifier includes at least one index of said list respectively pointing towards said at least one temporary identifier in said list. Here, it is noted that the list may be standardized, and the network node may have the same stored in its own memory or may have access to any other storage location thereof. That is, the retrieving may encompass reading the same from a memory, requesting the same from another location, and pre-determine the same based on the content of any storage location thereof.

According to a variation of the procedure shown in FIG. 6, exemplary additional operations are given, which are inherently independent from each other as such. According to such variation, said first message includes said temporary identifier assigned to said terminal, said information indicative of said at least one temporary identifier includes, for each of said at least one temporary identifier, a respective offset value from said temporary identifier assigned to said terminal, and an exemplary method according to example embodiments may comprise an operation of calculating each of said at least one temporary identifier based on said temporary identifier assigned to said terminal and said respective at least one offset value.

According to a variation of the procedure shown in FIG. 6, exemplary additional operations are given, which are inherently independent from each other as such. According to such variation, an exemplary method according to example embodiments may comprise an operation of receiving a system information block including, for each of said at least one temporary identifier, a respective offset value from said temporary identifier assigned to said terminal, and an operation of calculating each of said at least one temporary identifier based on said temporary identifier assigned to said terminal and said respective at least one offset value.

According to a variation of the procedure shown in FIG. 6, exemplary additional operations are given, which are inherently independent from each other as such. According to such variation, an exemplary method according to example embodiments may comprise an operation of retrieving at least one offset value, and an operation of calculating, for each of said at least one offset value, said at least one temporary identifier based on said temporary identifier assigned to said terminal and said respective at least one offset value. Here, it is noted that the offset value may be standardized, and the network node may have the same stored in its own memory or may have access to any other storage location thereof. That is, the retrieving may encompass reading the same from a memory, requesting the same from another location, and pre-determine the same based on the content of any storage location thereof.

According to further example embodiments, said connection request message is a random access procedure message 3.

According to further example embodiments, said first message is a random access procedure message 2.

According to further example embodiments, each of said at least one temporary identifier and/or said temporary identifier assigned to a terminal is a temporary cell radio network temporary identifier.

According to further example embodiments, said method is operable at or by a terminal, user equipment, mobile station or modem.

Example embodiments outlined and specified above are explained below in more specific terms.

Figure 7:
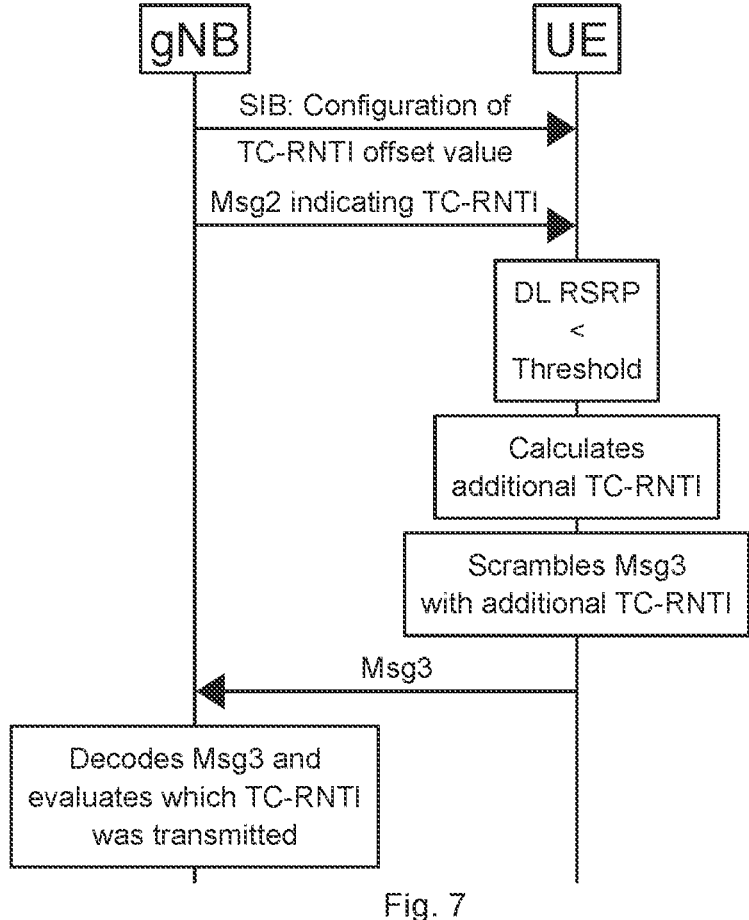
FIG. 7 shows a schematic diagram of signaling sequences according to example embodiments.

FIG. 7 shows a schematic diagram of signaling sequences according to example embodiments.

In a first step of FIG. 7, according to example embodiments, the gNB configures one or more TC-RNTI offset values either through one of the SIBs or via indication thereof in the Msg2. Alternatively, the additional TC-RNTI offset values may be defined through specifications.

According to example embodiments, the UE can be configured with one or more TC-RNTI values (and not offsets) that could be used to request PUCCH repetitions (indicate PUCCH repetition capability).

Here, according to example embodiments, if the gNB configures only one offset, the UE may be not expected to recommend a number of repetitions for the PUCCH of the Msg4, while, if the gNB configures more than one offset, the UE may be expected to recommend a number of repetitions for the PUCCH of the Msg4.

In a second step of FIG. 7, according to example embodiments, the gNB indicates a TC-RNTI in the Msg2 as by legacy procedure.

The UE is expected to utilize this TC-RNTI if the UE does not request PUCCH repetitions or if the UE does not support PUCCH repetitions.

In a third step of FIG. 7, according to example embodiments, the UE evaluates a metric (e.g. DL RSRP) for deciding whether to request PUCCH repetitions or not. While this step it optional, this step is preferable for the case where UE requests or demands or recommends PUCCH repetitions.

In a fourth step of FIG. 7, according to example embodiments, the UE, if the metric is satisfied (or if it is otherwise decided to request repetitions or to indicate repetition capability), calculates one or more additional TC-RNTI from the TC-RNTI value indicated in the Msg2 and the offset value(s) configured in the first step of FIG. 7.

According to example embodiments, the UE generates as many TC-RNTI values as the number of offsets configured in the first step of FIG. 7, each TC-RNTI value being associated to a number of recommended PUCCH repetitions. In case the UE is directly configured with multiple TC-RNTI values, such generation step may not be necessary and may not be performed.

Further, the UE then chooses one TC-RNTI from the set, based on the value of repetitions it wants to recommend to the network. Such recommendation can be based, for example, on the channel quality experienced by the UE.

In a fifth step of FIG. 7, according to example embodiments, the UE scrambles the Msg3 with the chosen TC-RNTI.

In a sixth step of FIG. 7, according to example embodiments, the UE transmits the (scrambled) Msg3 in the allocated time and frequency resources.

Finally, in a seventh step of FIG. 7, according to example embodiments, the network decodes the received Msg3, and by analyzing the associated cyclic redundancy check (CRC), the network is able to understand which TC-RNTI was chosen by the UE and which information the UE transmitted (i.e., whether repetition capability is indicated and/or whether repetition is requested/recommended and which number of repetition).

The above-described procedures and functions may be implemented by respective functional elements, processors, or the like, as described below.

In the foregoing exemplary description of the network entity, only the units that are relevant for understanding the principles of the disclosure have been described using functional blocks. The network entity may comprise further units that are necessary for its respective operation. However, a description of these units is omitted in this specification. The arrangement of the functional blocks of the devices is not construed to limit the disclosure, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 8:
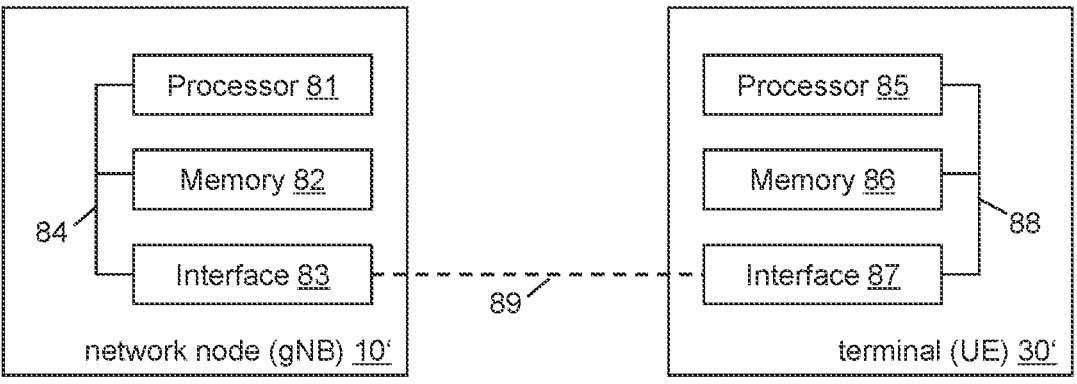
FIG. 8 is a block diagram alternatively illustrating apparatuses according to example embodiments.

In FIG. 8, an alternative illustration of apparatuses according to example embodiments is depicted. As indicated in FIG. 8, according to example embodiments, the apparatus (network node) 10' (corresponding to the network node 10) comprises a processor 81, a memory 82 and an interface 83, which are connected by a bus 84 or the like. Further, according to example embodiments, the apparatus (terminal) 30' (corresponding to the terminal 30) comprises a processor 85, a memory 86 and an interface 87, which are connected by a bus 88 or the like, and the apparatuses may be connected via link 89, respectively.

The processor 81/85 and/or the interface 83/87 may also include a modem or the like to facilitate communication over a (hardwire or wireless) link, respectively. The interface 83/87 may include a suitable transceiver coupled to one or more antennas or communication means for (hardwire or wireless) communications with the linked or connected device(s), respectively. The interface 83/87 is generally configured to communicate with at least one other apparatus, i.e. the interface thereof.

The memory 82/86 may store respective programs assumed to include program instructions or computer program code that, when executed by the respective processor, enables the respective electronic device or apparatus to operate in accordance with the example embodiments.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to example embodiments, an apparatus representing the network node 10 comprises at least one processor 81, at least one memory 82 including computer program code, and at least one interface 83 configured for communication with at least another apparatus. The processor (i.e. the at least one processor 81, with the at least one memory 82 and the computer program code) is configured to perform receiving, from a terminal, a connection request message (thus the apparatus comprising corresponding means for receiving), to perform checking whether said connection request message is scrambled utilizing any of at least one temporary identifier other than a temporary identifier assigned to said terminal (thus the apparatus comprising corresponding means for checking), and to perform concluding, if said connection request message is scrambled utilizing any of said at least one temporary identifier, that said terminal can make use of physical uplink control channel repetitions (thus the apparatus comprising corresponding means for concluding).

According to example embodiments, an apparatus representing the terminal 30 comprises at least one processor 85, at least one memory 86 including computer program code, and at least one interface 87 configured for communication with at least another apparatus. The processor (i.e. the at least one processor 85, with the at least one memory 86 and the computer program code) is configured to perform deciding whether to indicate that it can be made use of physical uplink control channel repetitions (thus the apparatus comprising corresponding means for deciding), to perform transmitting, towards a base station, a connection request message (thus the apparatus comprising corresponding means for transmitting), and to perform scrambling, if it is decided to indicate that said terminal can make use of physical uplink control channel repetitions, said connection request message utilizing a temporary identifier of at least one temporary identifier other than a temporary identifier assigned to said terminal (thus the apparatus comprising corresponding means for scrambling).

For further details regarding the operability/functionality of the individual apparatuses, reference is made to the above description in connection with any one of FIGS. 1 to 7, respectively.

For the purpose of the present disclosure as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present disclosure. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, there are provided measures for control channel repetition management. Such measures exemplarily comprise receiving, from a terminal, a connection request message, checking whether said connection request message is scrambled utilizing any of at least one temporary identifier other than a temporary identifier assigned to said terminal, and, if said connection request message is scrambled utilizing any of said at least one temporary identifier, concluding that said terminal can make use of physical uplink control channel repetitions.

Even though the disclosure is described above with reference to the examples according to the accompanying drawings, it is to be understood that the disclosure is not restricted thereto. Rather, it is apparent to those skilled in the art that the present disclosure can be modified in many ways without departing from the scope of the inventive idea as disclosed herein.

At least the following Items are covered by the above disclosure.

Item 1. A method comprising
receiving, from a terminal, a connection request message,
checking whether said connection request message is
    scrambled utilizing any of at least one temporary
    identifier other than a temporary identifier assigned to
    said terminal, and
if said connection request message is scrambled utilizing
    any of said at least one temporary identifier,
    concluding that said terminal can make use of physical
      uplink control channel repetitions.
Item 2. The method according to Item 1, wherein
that said terminal can make use of physical uplink control
    channel repetitions includes said terminal's capability
    for physical uplink control channel repetitions.
Item 3. The method according to Item 1, wherein
that said terminal can make use of physical uplink control
    channel repetitions includes said terminal's demand for
    physical uplink control channel repetitions.
Item 4. The method according to any of Items 1 to 3, wherein
in relation to said concluding, the method comprises
    concluding, if said connection request message is
      scrambled utilizing a first temporary identifier of said
      at least one temporary identifier, that said terminal
      recommends a first number of physical uplink con-
      trol channel repetitions, and
    concluding, if said connection request message is
      scrambled utilizing a second temporary identifier of
      said at least one temporary identifier different from
      said first temporary identifier of said at least one
      temporary identifier, that said terminal recommends
      a second number of physical uplink control channel
      repetitions different from said first number of physi-
      cal uplink control channel repetitions.
Item 5. The method according to any of Items 1 to 4, further comprising transmitting, towards said terminal, a first message,
    wherein said first message includes information indica-
    tive of said at least one temporary identifier.
Item 6. The method according to Item 5, wherein
said first message includes an uplink grant granting trans-
    mission of said connection request message.
Item 7. The method according to Item 5 or 6, wherein
said information indicative of said at least one temporary
    identifier includes said at least one temporary identifier.
Item 8. The method according to Item 5 or 6, further comprising
maintaining a list of a plurality of temporary identifiers
    including said at least one temporary identifier, wherein
said information indicative of said at least one temporary
    identifier includes at least one
Item 9. The method according to Item 8, further comprising
retrieving said list, or
broadcasting said list.
Item 10. The method according to Item 5 or 6, wherein
said first message includes said temporary identifier
    assigned to said terminal, and the method further com-
    prises
calculating, for each of said at least one temporary iden-
    tifier, a respective offset value from said temporary
    identifier assigned to said terminal, and wherein
said information indicative of said at least one temporary
    identifier includes said respective at least one offset
    value.
Item 11. The method according to any of Items 1 to 4, further comprising
calculating, for each of said at least one temporary iden-
    tifier, a respective offset value from said temporary
    identifier assigned to said terminal, and
including said respective at least one offset value into a
    system information block to be transmitted towards
    said terminal.
Item 12. The method according to any of Items 1 to 4, further comprising
retrieving at least one offset value, and
calculating, for each of said at least one offset value, said
    at least one temporary identifier based on said tempo-
    rary identifier assigned to said terminal and said respec-
    tive at least one offset value.
Item 13. The method according to any of Items 1 to 12, further comprising
reserving said at least one temporary identifier.
Item 14. The method according to any of Items 1 to 13, wherein
said connection request message is a random access
    procedure message 3, and/or
said first message is a random access procedure message
    2, and/or
each of said at least one temporary identifier and/or said
    temporary identifier assigned to a terminal is a tempo-
    rary cell radio network temporary identifier, and/or
the method is operable at or by a base station or access
    node of a cellular system.
Item 15. A method of a terminal, comprising
deciding whether to indicate that it can be made use of
    physical uplink control channel repetitions, and
transmitting, towards a base station, a connection request
    message, and
if it is decided to indicate that said terminal can make use
    of physical uplink control channel repetitions scrambling said connection request message utilizing a temporary identifier of at least one temporary identifier other than a temporary identifier assigned to said terminal.

Item 16. The method according to Item 15, wherein that said terminal can make use of physical uplink control channel repetitions includes said terminal's capability for physical uplink control channel repetitions.

Item 17. The method according to Item 16, wherein it is decided to indicate that said terminal can make use of physical uplink control channel repetitions, if, on initial access of said terminal, said terminal has capability for physical uplink control channel repetitions.

Item 18. The method according to Item 15, wherein that said terminal can make use of physical uplink control channel repetitions includes said terminal's demand for physical uplink control channel repetitions.

Item 19. The method according to Item 18, wherein it is decided to indicate that said terminal can make use of physical uplink control channel repetitions, if at least one downlink metric is below a predetermined threshold.

Item 20. The method according to Item 19, further comprising evaluating said downlink metrics.

Item 21. The method according to Item 18, wherein it is decided to indicate that said terminal can make use of physical uplink control channel repetitions based on channel conditions.

Item 22. The method according to Item 21, further comprising monitoring said channel conditions.

Item 23. The method according to any of Items 15 to 22, wherein in relation to said scrambling, the method comprises scrambling said connection request message utilizing a first temporary identifier of said at least one temporary identifier, if said terminal recommends a first number of physical uplink control channel repetitions, and scrambling said connection request message utilizing a second temporary identifier of said at least one temporary identifier different from said first temporary identifier of said at least one temporary identifier, if said terminal recommends a second number of physical uplink control channel repetitions different from said first number of physical uplink control channel repetitions.

Item 24. The method according to any of Items 15 to 23, further comprising receiving a first message, wherein said first message includes information indicative of said at least one temporary identifier.

Item 25. The method according to Item 24, wherein said first message includes an uplink grant granting transmission of said connection request message.

Item 26. The method according to Item 24 or 25, wherein said information indicative of said at least one temporary identifier includes said at least one temporary identifier.

Item 27. The method according to Item 24 or 25, further comprising retrieving a list of a plurality of temporary identifiers including said at least one temporary identifier, or receiving said list, wherein said information indicative of said at least one temporary identifier includes at least one index of said list respectively pointing towards said at least one temporary identifier in said list.

Item 28. The method according to Item 24 or 25, wherein said first message includes said temporary identifier assigned to said terminal, and said information indicative of said at least one temporary identifier includes, for each of said at least one temporary identifier, a respective offset value from said temporary identifier assigned to said terminal, and the method further comprises calculating each of said at least one temporary identifier based on said temporary identifier assigned to said terminal and said respective at least one offset value.

Item 29. The method according to any of Items 15 to 23, further comprising receiving a system information block including, for each of said at least one temporary identifier, a respective offset value from said temporary identifier assigned to said terminal, and calculating each of said at least one temporary identifier based on said temporary identifier assigned to said terminal and said respective at least one offset value.

Item 30. The method according to any of Items 15 to 23, further comprising retrieving at least one offset value, and calculating, for each of said at least one offset value, said at least one temporary identifier based on said temporary identifier assigned to said terminal and said respective at least one offset value.

Item 31. The method according to any of Items 15 to 30, wherein said connection request message is a random access procedure message 3, and/or said first message is a random access procedure message 2, and/or each of said at least one temporary identifier and/or said temporary identifier assigned to a terminal is a temporary cell radio network temporary identifier, and/or the method is operable at or by a terminal, user equipment, mobile station or modem.

Item 32. An apparatus comprising receiving circuitry configured to receive, from a terminal, a connection request message, checking circuitry configured to check whether said connection request message is scrambled utilizing any of at least one temporary identifier other than a temporary identifier assigned to said terminal, and concluding circuitry configured to, if said connection request message is scrambled utilizing any of said at least one temporary identifier, conclude that said terminal can make use of physical uplink control channel repetitions.

Item 33. The apparatus according to Item 32, wherein that said terminal can make use of physical uplink control channel repetitions includes said terminal's capability for physical uplink control channel repetitions.

Item 34. The apparatus according to Item 32, wherein that said terminal can make use of physical uplink control channel repetitions includes said terminal's demand for physical uplink control channel repetitions.

Item 35. The apparatus according to any of Items 32 to 34, further comprising concluding circuitry configured to conclude, if said connection request message is scrambled utilizing a first temporary identifier of said at least one temporary identifier, that said terminal recommends a first number of physical uplink control channel repetitions, and to conclude, if said connection request message is scrambled utilizing a second temporary identifier of said at least one temporary identifier different from said first temporary identifier of said at least one temporary identifier, that said terminal recommends a second number of physical uplink control channel repetitions different from said first number of physical uplink control channel repetitions.

Item 36. The apparatus according to any of Items 32 to 35, further comprising transmitting circuitry configured to transmit, towards said terminal, a first message, wherein said first message includes information indicative of said at least one temporary identifier.

Item 37. The apparatus according to Item 36, wherein said first message includes an uplink grant granting transmission of said connection request message.

Item 38. The apparatus according to Item 36 or 37, wherein said information indicative of said at least one temporary identifier includes said at least one temporary identifier.

Item 39. The apparatus according to Item 36 or 37, further comprising maintaining circuitry configured to maintain a list of a plurality of temporary identifiers including said at least one temporary identifier, wherein said information indicative of said at least one temporary identifier includes at least one index of said list respectively pointing towards said at least one temporary identifier in said list.

Item 40. The apparatus according to Item 39, further comprising retrieving circuitry configured to retrieve said list, or broadcasting circuitry configured to broadcast said list.

Item 41. The apparatus according to Item 36 or 37, wherein said first message includes said temporary identifier assigned to said terminal, and the apparatus further comprises calculating circuitry configured to calculate, for each of said at least one temporary identifier, a respective offset value from said temporary identifier assigned to said terminal, and wherein said information indicative of said at least one temporary identifier includes said respective at least one offset value.

Item 42. The apparatus according to any of Items 32 to 35, further comprising calculating circuitry configured to calculate, for each of said at least one temporary identifier, a respective offset value from said temporary identifier assigned to said terminal, and including circuitry configured to include said respective at least one offset value into a system information block to be transmitted towards said terminal.

Item 43. The apparatus according to any of Items 32 to 35, further comprising retrieving circuitry configured to retrieve at least one offset value, and calculating circuitry configured to calculate, for each of said at least one offset value, said at least one temporary identifier based on said temporary identifier assigned to said terminal and said respective at least one offset value.

Item 44. The apparatus according to any of Items 32 to 43, further comprising reserving circuitry configured to reserve said at least one temporary identifier.

Item 45. The apparatus according to any of Items 32 to 44, wherein said connection request message is a random access procedure message 3, and/or said first message is a random access procedure message 2, and/or each of said at least one temporary identifier and/or said temporary identifier assigned to a terminal is a temporary cell radio network temporary identifier, and/or the apparatus is operable as or at a base station or access node of a cellular system.

Item 46. An apparatus of a terminal, comprising deciding circuitry configured to decide whether to indicate that it can be made use of physical uplink control channel repetitions, transmitting circuitry configured to transmit, towards a base station, a connection request message, and scrambling circuitry configured to, if it is decided to indicate that said terminal can make use of physical uplink control channel repetitions, scramble said connection request message utilizing a temporary identifier of at least one temporary identifier other than a temporary identifier assigned to said terminal.

Item 47. The apparatus according to Item 46, wherein that said terminal can make use of physical uplink control channel repetitions includes said terminal's capability for physical uplink control channel repetitions.

Item 48. The apparatus according to Item 47, wherein it is decided to indicate that said terminal can make use of physical uplink control channel repetitions, if, on initial access of said terminal, said terminal has capability for physical uplink control channel repetitions.

Item 49. The apparatus according to Item 46, wherein that said terminal can make use of physical uplink control channel repetitions includes said terminal's demand for physical uplink control channel repetitions.

Item 50. The apparatus according to Item 49, wherein it is decided to indicate that said terminal can make use of physical uplink control channel repetitions, if at least one downlink metric is below a predetermined threshold.

Item 51. The apparatus according to Item 50, further comprising evaluating circuitry configured to evaluate said downlink metrics.

Item 52. The apparatus according to Item 49, wherein it is decided to indicate that said terminal can make use of physical uplink control channel repetitions based on channel conditions.

Item 53. The apparatus according to Item 52, further comprising monitoring circuitry configured to monitor said channel conditions.

Item 54. The apparatus according to any of Items 46 to 53, further comprising scrambling circuitry configured to scramble said connection request message utilizing a first temporary identifier of said at least one temporary identifier, if said terminal recommends a first number of physical uplink control channel repetitions, and to scramble said connection request message utilizing a second temporary identifier of said at least one temporary identifier different from said first temporary identifier of said at least one temporary identifier, if said terminal recommends a second number of physical uplink control channel repetitions different from said first number of physical uplink control channel repetitions.

Item 55. The apparatus according to any of Items 46 to 54, further comprising receiving circuitry configured to receive a first message, wherein said first message includes information indicative of said at least one temporary identifier.

Item 56. The apparatus according to Item 55, wherein said first message includes an uplink grant granting transmission of said connection request message.

Item 57. The apparatus according to Item 55 or 56, wherein said information indicative of said at least one temporary identifier includes said at least one temporary identifier.

Item 58. The apparatus according to Item 55 or 56, further comprising retrieving circuitry configured to retrieve a list of a plurality of temporary identifiers including said at least one temporary identifier, or receiving circuitry configured to receive said list, wherein said information indicative of said at least one temporary identifier includes at least one Item 59. The apparatus according to Item 55 or 56, wherein said first message includes said temporary identifier assigned to said terminal, and said information indicative of said at least one temporary identifier includes, for each of said at least one temporary identifier, a respective offset value from said temporary identifier assigned to said terminal, and the apparatus further comprises calculating circuitry configured to calculate each of said at least one temporary identifier based on said temporary identifier assigned to said terminal and said respective at least one offset value.

Item 60. The apparatus according to any of Items 46 to 54, further comprising receiving circuitry configured to receive a system information block including, for each of said at least one temporary identifier, a respective offset value from said temporary identifier assigned to said terminal, and calculating circuitry configured to calculate each of said at least one temporary identifier based on said temporary identifier assigned to said terminal and said respective at least one offset value.

Item 61. The apparatus according to any of Items 46 to 54, further comprising retrieving circuitry configured to retrieve at least one offset value, and calculating circuitry configured to calculate, for each of said at least one offset value, said at least one temporary identifier based on said temporary identifier assigned to said terminal and said respective at least one offset value.

Item 62. The apparatus according to any of Items 46 to 61, wherein said connection request message is a random access procedure message 3, and/or said first message is a random access procedure message 2, and/or each of said at least one temporary identifier and/or said temporary identifier assigned to a terminal is a temporary cell radio network temporary identifier, and/or the apparatus is operable as or at a terminal, user equipment, mobile station or modem.

Item 63. An apparatus comprising at least one processor, at least one memory including computer program code, and at least one interface configured for communication with at least another apparatus, the at least one processor, with the at least one memory and the computer program code, being configured to cause the apparatus to perform:

receiving, from a terminal, a connection request message, checking whether said connection request message is scrambled utilizing any of at least one temporary identifier other than a temporary identifier assigned to said terminal, and if said connection request message is scrambled utilizing any of said at least one temporary identifier, concluding that said terminal can make use of physical uplink control channel repetitions.

Item 64. The apparatus according to Item 63, wherein that said terminal can make use of physical uplink control channel repetitions includes said terminal's capability for physical uplink control channel repetitions.

Item 65. The apparatus according to Item 63, wherein that said terminal can make use of physical uplink control channel repetitions includes said terminal's demand for physical uplink control channel repetitions.

Item 66. The apparatus according to any of Items 63 to 65, wherein in relation to said concluding, the at least one processor, with the at least one memory and the computer program code, being configured to cause the apparatus to perform:

concluding, if said connection request message is scrambled utilizing a first temporary identifier of said at least one temporary identifier, that said terminal recommends a first number of physical uplink control channel repetitions, and concluding, if said connection request message is scrambled utilizing a second temporary identifier of said at least one temporary identifier different from said first temporary identifier of said at least one temporary identifier, that said terminal recommends a second number of physical uplink control channel repetitions different from said first number of physical uplink control channel repetitions.

Item 67. The apparatus according to any of Items 63 to 66, wherein the at least one processor, with the at least one memory and the computer program code, being configured to cause the apparatus to perform:

transmitting, towards said terminal, a first message, wherein said first message includes information indicative of said at least one temporary identifier.

Item 68. The apparatus according to Item 67, wherein said first message includes an uplink grant granting transmission of said connection request message.

Item 69. The apparatus according to Item 67 or 68, wherein said information indicative of said at least one temporary identifier includes said at least one temporary identifier.

Item 70. The apparatus according to Item 67 or 68, wherein the at least one processor, with the at least one memory and the computer program code, being configured to cause the apparatus to perform:

maintaining a list of a plurality of temporary identifiers including said at least one temporary identifier, wherein said information indicative of said at least one temporary identifier includes at least one index of said list respectively pointing towards said at least one temporary identifier in said list.

Item 71. The apparatus according to Item 70, wherein the at least one processor, with the at least one memory and the computer program code, being configured to cause the apparatus to perform:

retrieving said list, or broadcasting said list.

Item 72. The apparatus according to Item 67 or 68, wherein said first message includes said temporary identifier assigned to said terminal, and the at least one processor, with the at least one memory and the computer program code, being configured to cause the apparatus to perform:

calculating, for each of said at least one temporary identifier, a respective offset value from said temporary identifier assigned to said terminal, and wherein said information indicative of said at least one temporary identifier includes said respective at least one offset value.

Item 73. The apparatus according to any of Items 63 to 66, wherein the at least one processor, with the at least one memory and the computer program code, being configured to cause the apparatus to perform:

calculating, for each of said at least one temporary identifier, a respective offset value from said temporary identifier assigned to said terminal, and including said respective at least one offset value into a system information block to be transmitted towards said terminal.

Item 74. The apparatus according to any of Items 63 to 66, wherein the at least one processor, with the at least one memory and the computer program code, being configured to cause the apparatus to perform:

retrieving at least one offset value, and calculating, for each of said at least one offset value, said at least one temporary identifier based on said temporary identifier assigned to said terminal and said respective at least one offset value.

Item 75. The apparatus according to any of Items 63 to 74, wherein the at least one processor, with the at least one memory and the computer program code, being configured to cause the apparatus to perform:

reserving said at least one temporary identifier.

Item 76. The apparatus according to any of Items 63 to 75, wherein said connection request message is a random access procedure message 3, and/or said first message is a random access procedure message 2, and/or each of said at least one temporary identifier and/or said temporary identifier assigned to a terminal is a temporary cell radio network temporary identifier, and/or the apparatus is operable as or at a base station or access node of a cellular system.

Item 77. An apparatus of a terminal, comprising at least one processor, at least one memory including computer program code, and at least one interface configured for communication with at least another apparatus, the at least one processor, with the at least one memory and the computer program code, being configured to cause the apparatus to perform:

deciding whether to indicate that it can be made use of physical uplink control channel repetitions, and transmitting, towards a base station, a connection request message, and if it is decided to indicate that said terminal can make use of physical uplink control channel repetitions scrambling said connection request message utilizing a temporary identifier of at least one temporary identifier other than a temporary identifier assigned to said terminal.

Item 78. The apparatus according to Item 77, wherein that said terminal can make use of physical uplink control channel repetitions includes said terminal's capability for physical uplink control channel repetitions.

Item 79. The apparatus according to Item 78, wherein it is decided to indicate that said terminal can make use of physical uplink control channel repetitions, if, on initial access of said terminal, said terminal has capability for physical uplink control channel repetitions.

Item 80. The apparatus according to Item 77, wherein that said terminal can make use of physical uplink control channel repetitions includes said terminal's demand for physical uplink control channel repetitions.

Item 81. The apparatus according to Item 80, wherein it is decided to indicate that said terminal can make use of physical uplink control channel repetitions, if at least one downlink metric is below a predetermined threshold.

Item 82. The apparatus according to Item 81, wherein the at least one processor, with the at least one memory and the computer program code, being configured to cause the apparatus to perform:

evaluating said downlink metrics.

Item 83. The apparatus according to Item 80, wherein it is decided to indicate that said terminal can make use of physical uplink control channel repetitions based on channel conditions.

Item 84. The apparatus according to Item 83, wherein the at least one processor, with the at least one memory and the computer program code, being configured to cause the apparatus to perform:

monitoring said channel conditions.

Item 85. The apparatus according to any of Items 77 to 84, wherein in relation to said scrambling, the at least one processor, with the at least one memory and the computer program code, being configured to cause the apparatus to perform:

scrambling said connection request message utilizing a first temporary identifier of said at least one temporary identifier, if said terminal recommends a first number of physical uplink control channel repetitions, and scrambling said connection request message utilizing a second temporary identifier of said at least one temporary identifier different from said first temporary identifier of said at least one temporary identifier, if said terminal recommends a second number of physical uplink control channel repetitions different from said first number of physical uplink control channel repetitions.

Item 86. The apparatus according to any of Items 77 to 85, wherein the at least one processor, with the at least one memory and the computer program code, being configured to cause the apparatus to perform:

receiving a first message, wherein said first message includes information indicative of said at least one temporary identifier.

Item 87. The apparatus according to Item 86, wherein said first message includes an uplink grant granting transmission of said connection request message.

Item 88. The apparatus according to Item 86 or 87, wherein said information indicative of said at least one temporary identifier includes said at least one temporary identifier.

Item 89. The apparatus according to Item 86 or 87, wherein the at least one processor, with the at least one memory and the computer program code, being configured to cause the apparatus to perform:

retrieving a list of a plurality of temporary identifiers including said at least one temporary identifier, or receiving said list, wherein said information indicative of said at least one temporary identifier includes at least one Item 90. The apparatus according to Item 86 or 87, wherein said first message includes said temporary identifier assigned to said terminal, and said information indicative of said at least one temporary identifier includes, for each of said at least one temporary identifier, a respective offset value from said temporary identifier assigned to said terminal, and the at least one processor, with the at least one memory and the computer program code, being configured to cause the apparatus to perform:

calculating each of said at least one temporary identifier based on said temporary identifier assigned to said terminal and said respective at least one offset value.

Item 91. The apparatus according to any of Items 77 to 85, wherein the at least one processor, with the at least one memory and the computer program code, being configured to cause the apparatus to perform:

receiving a system information block including, for each of said at least one temporary identifier, a respective offset value from said temporary identifier assigned to said terminal, and calculating each of said at least one temporary identifier based on said temporary identifier assigned to said terminal and said respective at least one offset value.

Item 92. The apparatus according to any of Items 77 to 85, wherein the at least one processor, with the at least one memory and the computer program code, being configured to cause the apparatus to perform:

retrieving at least one offset value, and calculating, for each of said at least one offset value, said at least one temporary identifier based on said temporary identifier assigned to said terminal and said respective at least one offset value.

Item 93. The apparatus according to any of Items 77 to 92, wherein said connection request message is a random access procedure message 3, and/or said first message is a random access procedure message 2, and/or each of said at least one temporary identifier and/or said temporary identifier assigned to a terminal is a temporary cell radio network temporary identifier, and/or the apparatus is operable as or at a terminal, user equipment, mobile station or modem.

Item 94. A computer program product comprising computer-executable computer program code which, when the program is run on a computer, is configured to cause the computer to carry out the method according to any one of Items 1 to 14 or 15 to 31.

Item 95. The computer program product according to Item 94, wherein the computer program product comprises a computer-readable medium on which the computer-executable computer program code is stored, and/or wherein the program is directly loadable into an internal memory of the computer or a processor thereof.

LIST OF ACRONYMS AND ABBREVIATIONS

3GPP 3rd Generation Partnership Project
CRC cyclic redundancy check
CSI channel state information
DCI downlink control information
DL downlink
gNB NR nodeB
HARQ hybrid automatic repeat request
HARQ-ACK hybrid automatic repeat request acknowledgement
LOS line-of-sight
NR New Radio
NTN non-terrestrial network
Msg2 message 2 of RA procedure
Msg3 message 3 of RA procedure
Msg4 message 4 of RA procedure
PDSCH physical downlink shared channel
PRI PUCCH resource indicator
PUCCH physical uplink control channel
RA random access
RRC radio resource control
RSRP reference signal received power
SFN system frame number
SIB system information block
SR scheduling request
TC-RNTI temporary cell radio network temporary identifier
UCI uplink control information
UE user equipment
UL uplink
VoIP voice over internet protocol

The invention claimed is:

1. An apparatus, comprising:

at least one processor;

at least one memory including computer program code; and at least one interface configured for communication with at least another apparatus, the at least one processor, with the at least one memory and the computer program code, being configured to cause the apparatus at least to:

receive, from a terminal, a connection request message, wherein the connection request message is a random access procedure message 3, check whether said connection request message is scrambled utilizing any of at least one temporary identifier other than a temporary identifier assigned to said terminal, and if said connection request message is scrambled utilizing any of said at least one temporary identifier, conclude that said terminal can make use of physical uplink control channel repetitions.

2. The apparatus according to claim 1, wherein:

that said terminal can make use of physical uplink control channel repetitions includes said terminal's capability for physical uplink control channel repetitions, or that said terminal can make use of physical uplink control channel repetitions includes said terminal's demand for physical uplink control channel repetitions.

3. The apparatus according to claim 1, wherein in relation to said concluding, the apparatus is further caused to:

conclude, if said connection request message is scrambled utilizing a first temporary identifier of said at least one temporary identifier, that said terminal recommends a first number of physical uplink control channel repetitions, and conclude, if said connection request message is scrambled utilizing a second temporary identifier of said at least one temporary identifier different from said first temporary identifier, that said terminal recommends a second number of physical uplink control channel repetitions different from said first number of physical uplink control channel repetitions.

4. The apparatus according to claim 1, wherein the apparatus is further caused to:

transmit, towards said terminal, a first message, wherein said first message includes information indicative of said at least one temporary identifier.

5. The apparatus according to claim 4, wherein the apparatus is further caused to:

maintain a list of a plurality of temporary identifiers including said at least one temporary identifier, wherein said information indicative of said at least one temporary identifier includes at least one index of said list respectively pointing towards said at least one temporary identifier in said list.

6. The apparatus according to claim 4, wherein said first message includes said temporary identifier assigned to said terminal, and wherein the apparatus is further caused to:

calculate, for each of said at least one temporary identifier, a respective offset value from said temporary identifier assigned to said terminal, wherein said information indicative of said at least one temporary identifier includes said respective at least one offset value.

7. The apparatus according to claim 1, wherein the apparatus is further caused to:

calculate, for each of said at least one temporary identifier, a respective offset value from said temporary identifier assigned to said terminal, and include said respective at least one offset value into a system information block to be transmitted towards said terminal.

8. The apparatus according to claim 1, wherein the apparatus is further caused to:

retrieve at least one offset value, and calculate, for each of said at least one offset value, said at least one temporary identifier based on said temporary identifier assigned to said terminal and said respective at least one offset value.

9. An apparatus, comprising:

at least one processor;

at least one memory including computer program code; and at least one interface configured for communication with at least another apparatus, the at least one processor, with the at least one memory and the computer program code, being configured to cause the apparatus at least to:

decide whether to indicate that the apparatus can make use of physical uplink control channel repetitions, and transmit, towards a base station, a connection request message, wherein the connection request message is a random access procedure message 3, and if it is decided to indicate that said apparatus can make use of physical uplink control channel repetitions, scramble said connection request message utilizing a temporary identifier of at least one temporary identifier other than a temporary identifier assigned to said apparatus.

10. The apparatus according to claim 9, wherein the apparatus is further caused to:

decide to indicate that said apparatus can make use of physical uplink control channel repetitions if, on initial access of said apparatus, said apparatus has capability for physical uplink control channel repetitions.

11. The apparatus according to claim 9, wherein the apparatus is further caused to:

decide to indicate that said apparatus can make use of physical uplink control channel repetitions if at least one downlink metric is below a predetermined threshold, and evaluate said at least one downlink metric.

12. The apparatus according to claim 9, wherein the apparatus is further caused to perform:

decide to indicate that said apparatus can make use of physical uplink control channel repetitions based on channel conditions, and monitor said channel conditions.

13. The apparatus according to claim 9, wherein in relation to said scrambling, the apparatus is further caused to:

scramble said connection request message utilizing a first temporary identifier of said at least one temporary identifier, if said apparatus recommends a first number of physical uplink control channel repetitions, or scramble said connection request message utilizing a second temporary identifier of said at least one temporary identifier different from said first temporary identifier, if said apparatus recommends a second number of physical uplink control channel repetitions different from said first number of physical uplink control channel repetitions.

14. The apparatus according to claim 9, wherein the apparatus is further caused to:

receive a first message, wherein said first message includes information indicative of said at least one temporary identifier.

15. The apparatus according to claim 14, wherein the apparatus is further caused to:

retrieve a list of a plurality of temporary identifiers including said at least one temporary identifier, or receive said list, wherein said information indicative of said at least one temporary identifier includes at least one index of said list respectively pointing towards said at least one temporary identifier in said list.

16. The apparatus according to claim 14, wherein said first message includes said temporary identifier assigned to said apparatus, and said information indicative of said at least one temporary identifier includes, for each of said at least one temporary identifier, a respective offset value from said temporary identifier assigned to said apparatus, wherein the apparatus is further caused to:

calculate each of said at least one temporary identifier based on said temporary identifier assigned to said apparatus and said respective at least one offset value.

17. The apparatus according to claim 9, wherein the apparatus is further caused to:

receive a system information block including, for each of said at least one temporary identifier, a respective offset value from said temporary identifier assigned to said apparatus, and calculate each of said at least one temporary identifier based on said temporary identifier assigned to said apparatus and said respective at least one offset value.

18. The apparatus according to claim 9, wherein the apparatus is further caused to:

retrieve at least one offset value, and calculate, for each of said at least one offset value, said at least one temporary identifier based on said temporary identifier assigned to said apparatus and said respective at least one offset value.

19. A method, comprising:

deciding whether to indicate that a terminal can make use of physical uplink control channel repetitions, transmitting, towards a base station, a connection request message, wherein the connection request message is a random access procedure message 3, and scrambling, if it is decided to indicate that said terminal can make use of physical uplink control channel repetitions, said connection request message utilizing a temporary identifier of at least one temporary identifier other than a temporary identifier assigned to said terminal.

20. The method of claim 19, wherein in relation to said scrambling, the method further comprises:

scrambling said connection request message utilizing a first temporary identifier of said at least one temporary identifier, if said terminal recommends a first number of physical uplink control channel repetitions, or scrambling said connection request message utilizing a second temporary identifier of said at least one temporary identifier different from said first temporary identifier, if said terminal recommends a second number of physical uplink control channel repetitions different from said first number of physical uplink control channel repetitions.

\* \* \* \* \*